C. R. JONES.
Apron for Stock-Cars.
No. 160,329.
Patented March 2, 1875.
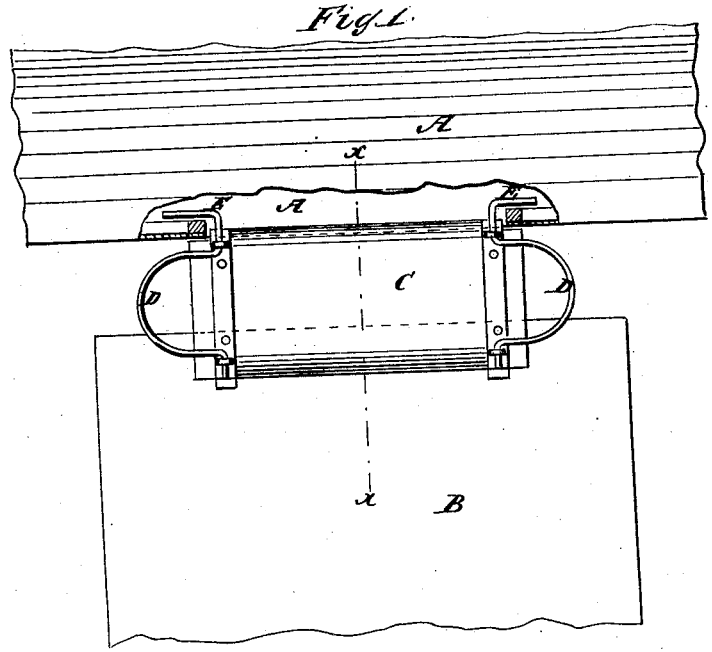
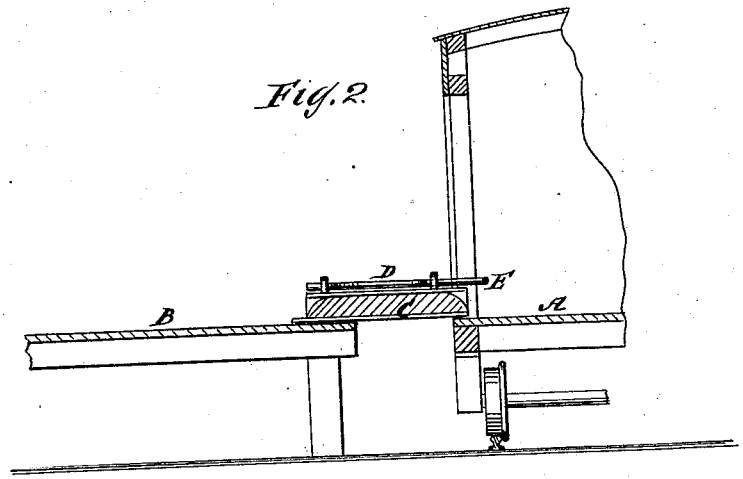
WITNESSES:
E. Wolff
A. F. Terry
INVENTOR:
C. R. Jones
BY
ATTORNEYS.
THE GRAPHIC CO.PHOTO-LITH.39 & 41 PARK PLACE,N.Y.

UNITED STATES PATENT OFFICE.

CHAPMAN R. JONES, OF BERLIN, ILLINOIS.

IMPROVEMENT IN APRONS FOR STOCK-CARS.

Specification forming part of Letters Patent No. 160,329, dated March 2, 1875; application filed January 30, 1875.

*To all whom it may concern:*

Be it known that I, CHAPMAN R. JONES, of Berlin, in the county of Sangamon and State of Illinois, have invented a new and useful Improvement in Apron for Stock-Cars, of which the following is a specification:

Figure 1 is a top view of my improved apron, shown as applied to a car and platform. Fig. 2 is a vertical cross-section of the same, taken through the line $x\ x$, Fig. 1.

Similar letters of reference indicate corresponding parts.

My invention has for its object to furnish an improved apron for use in transferring stock and freight from and to cars, and which shall be so constructed as not to be moved out of place by the tramping of the stock and by handling the freight.

The invention consists in the combination of the bails or handles and the hooks with the apron, to enable it to be readily secured to and released from the door-posts of a car, as hereinafter fully described.

A represents a car, to or from which stock or freight is to be transferred from or to the platform B. C is the apron that covers the space between the car and platform. To the end parts of the apron C are pivoted two bails or bows, D, to the inner ends of which are attached, or upon them are formed, hooks E, which, when turned down outward, hook around the door-posts of the car, so as to keep the apron C in place. By turning the bails and hooks D E down inward the apron C can be readily moved into or out of place.

By this construction the weight of the bails or handles D will hold the hooks E in place when turned down in either direction.

By this construction the apron C cannot be displaced by the tramping of stock in passing into and out of the cars, or by the moving out and in in handling freight.

Having thus described my invention, I claim as new, and desire to secure by Letters Patent—

The combination of the bails or handles D and hooks E with the apron C, for enabling it to be readily secured to and released from the door-posts of a car, substantially as set forth.

CHAPMAN R. JONES.

Witnesses:
T. F. BEVANS,
J. D. BEVANS.